Figure 1:
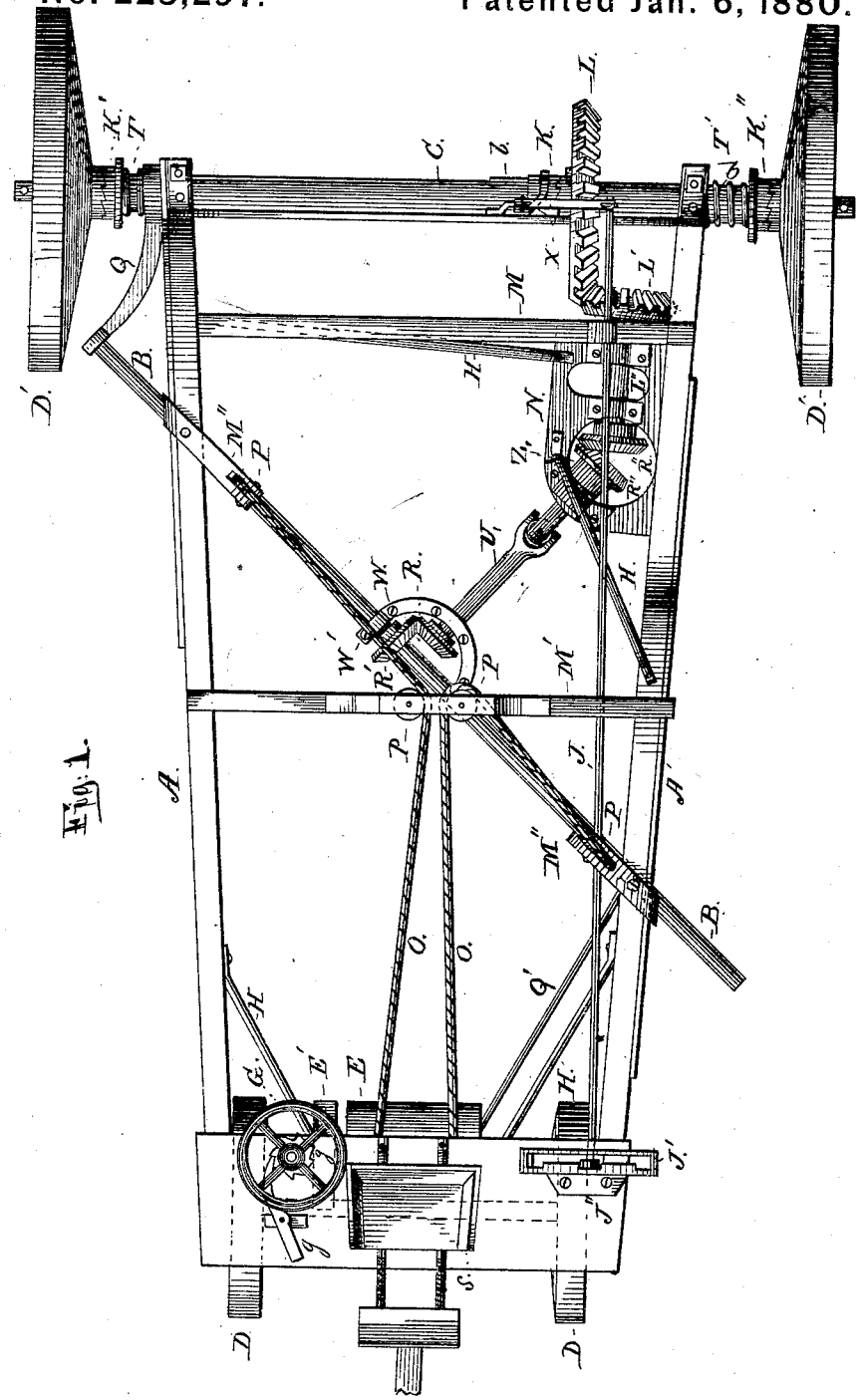

3 Sheets—Sheet 1.

E. G. ROCK.
Street-Sweeper.

No. 223,297. Patented Jan. 6, 1880.

WITNESSES
Harry Aubrey Toulmin
J. Joseph McCarthy

INVENTOR
Eugene G. Rock
By Morton Toulmin
ATTORNEYS

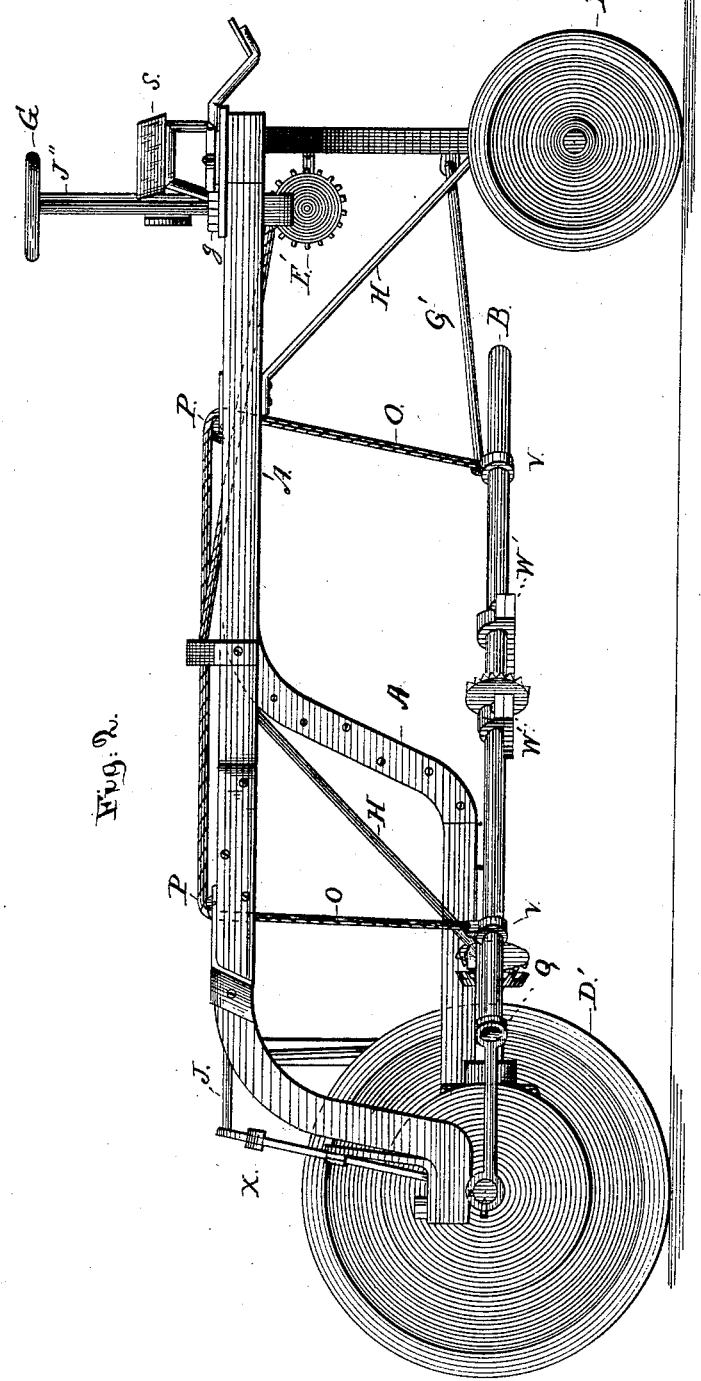

3 Sheets—Sheet 3.
E. G. ROCK.
Street-Sweeper.
No. 223,297.   Patented Jan. 6, 1880.
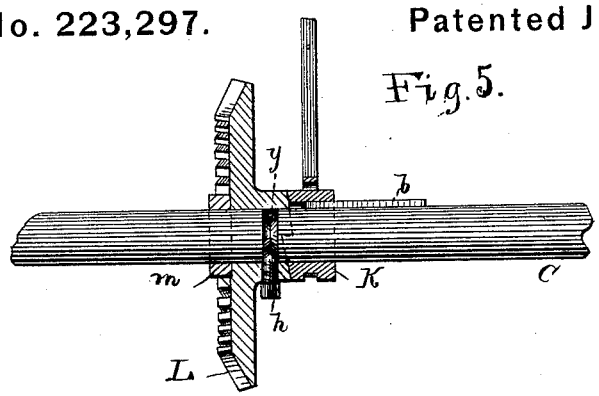
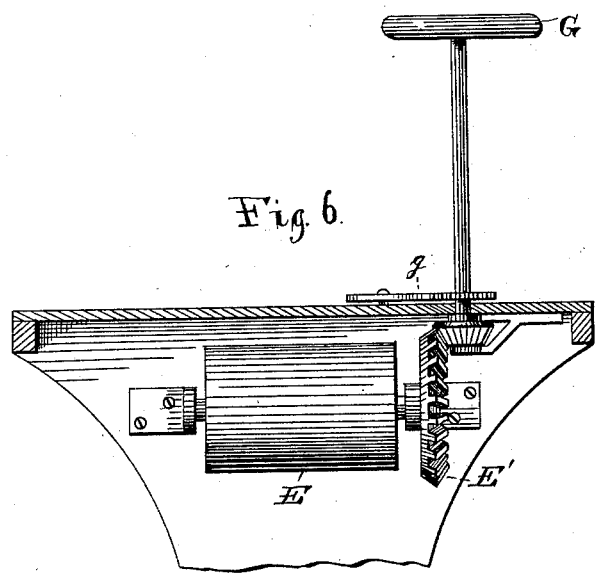
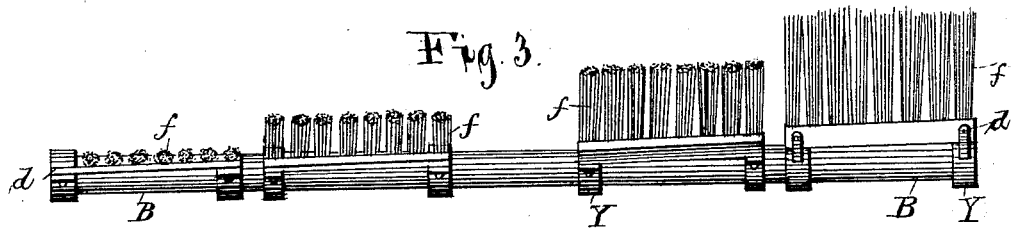
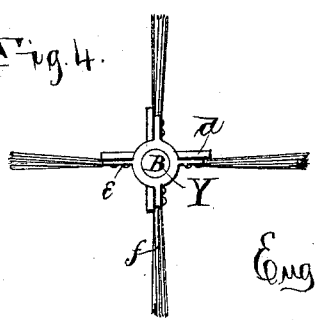
WITNESSES
H. Aubrey Toulmin.
F. L. Aurand
INVENTOR
Eugene G. Rock.
Morton Toulmin ATTORNEY

UNITED STATES PATENT OFFICE.

EUGENE G. ROCK, OF NORTHFIELD, VERMONT.

STREET-SWEEPER.

SPECIFICATION forming part of Letters Patent No. 223,297, dated January 6, 1880.

Application filed February 24, 1879.

*To all whom it may concern:*

Be it known that I, EUGENE G. ROCK, of Northfield, in the county of Washington and State of Vermont, have invented a new and useful Improvement in Street-Sweepers, of which the following is a specification.

The object of my invention is to make a street-sweeper which shall do more work with a given amount of power than those now or heretofore in use; also, to enable the driver to adjust the brooms and throw the wheels in and out of gear without getting down from his seat.

In the accompanying drawings, forming a part of this specification, similar letters of reference indicate like parts.

Figure 1 is a plan view of the sweeper with the brooms removed from the broom-shaft. Fig. 2 is a side elevation with one of the wheels, D′, removed. Fig. 3 is a detail view of the broom-shaft, showing the arrangement of the brooms and manner of fastening them. Fig. 4 is an end view of the broom-shaft and brooms. Fig. 5 is a vertical section of the wheel L, collar M, clutch K, and feather $b$; also, a portion of the shaft C, with groove $y$ and set-screw $h$. Fig. 6 is a side elevation of the windlass E, taken from the rear, showing the wheel and pinion E′, with its hand-wheel and shaft G and pawl and ratchet-wheel $g$.

A A, frame-work, which serves to connect the front and hind wheels, and also supports the broom-shaft and brooms. It may be made of wood, iron, or other suitable material.

O O are chains or wire ropes, the front ends of which are attached to windlass E, then passed over and through pulleys P P P P. These chains have their rear ends fastened to collars V, surrounding the broom-shaft B, thus suspending it beneath frame A A, and at the same time allowing the shaft to revolve freely.

Q Q′ are braces, which keep the broom-shaft in its proper position, each brace having a collar at one end encircling the broom-shaft B, the collar of Q′ being placed about one-fourth of the length of the shaft from its front end, and the collar of Q being attached to the rear end of the broom-shaft. The front end of brace Q′ is pivoted or hinged to the bolster of the sweeper, so that it may move freely up and down with the broom-shaft. The rear end of brace Q is attached to the axle-tree C by a collar, or it is hinged to the frame A A, so the brace may rise and fall with the shaft.

S is the driver's seat. D D D′ D′ are the front and hind wheels.

Motion is imparted to the broom-shaft by means of the bevel-gears L L′ R R′, shaft, and universal joint U. The shaft U is placed at right angles to the broom-shaft B. It is held in position by the semicircular support $w'$ $w$, which is attached to the broom-shaft by the collars W′ W.

The wheels D′ D′ are thrown in and out of gear by the clutches K′ K″. The springs T hold the clutches K′ K″ into gear while the sweeper is going forward; but when the machine is backed the clutches permit the wheels to revolve without turning the axle-tree C.

M M′ are braces to strengthen and steady the frame A. M′ M″ are supports to the pulleys P P. N is a support for the journal-boxes of the shafts U and L″.

J″ is a handle to the shaft J. It moves in a slot in the support J′, which is provided with three recesses to hold the handle J′ in any required position. The shaft J operates the clutch K, which throws the bevel-wheel L in and out of gear.

The brooms are attached to the broom-shaft B in sections. Each section has the brooms placed upon it in a spiral direction to the broom-shaft, so that in sweeping only a portion of each section may touch the ground when in operation, and by this means reduce the friction to the greatest possible extent.

The wheel L is kept in its proper place on the axle-tree C by a collar on one side and a set-screw in the boss, the point of which enters into a groove in the axle-tree C.

In transmitting the motion from the shaft C to the broom-shaft B, the bevel-gears R″ R″ may be dispensed with and replaced by the universal joint U, attached directly to the shaft L″. The clutches K′ K″ are prevented from turning upon the shaft C by feathers $b$.

The broom-shaft B is hung in two places, one place on each side of its center and about one-fourth of its whole length from its ends. This prevents it from springing, and causes the brooms to sweep more regularly throughout their whole length.

The brooms are attached to the shaft B by hubs Y, having any convenient number of arms or spokes E. Longitudinal pieces of wood or metal d are fastened to the spokes E, and to these the brooms are attached in any convenient manner.

I am aware that brooms in street-sweeping machines have already been made in a continuous spiral, and also in sections in a line with the broom-shaft.

I do not claim either of these methods separately; but what I do claim in a street-sweeping machine is the attachment of the brooms to the shaft B in sections in such manner that each section is placed at an angle to the axis of the broom-shaft, so that the whole number of sections thus placed will form a spiral partly round the shaft; and I beg, respectfully, to submit the following advantages to be derived from the above method of construction: First, by constructing the brooms in sections the broom-shaft B may be suspended and held in place at or near equal distances from the ends and center of shaft B, whereby said shaft B is prevented from springing or sagging and a lighter shaft may be used; second, by placing the sections at an angle to the broom-shaft B a portion or part only of each section of the broom comes in contact with the pavement when the broom revolves, whereby the amount of friction is reduced; third, by reason of the brooms being placed in spirals, as above described, the material swept will be thrown at a greater angle with the center line of the machine than if placed parallel with the axis of the broom-shaft B, thereby requiring less power to perform the duty assigned.

What I claim is—

1. The shaft and universal joint U, placed at right angles to the broom-shaft B, in combination with the bevel-wheels R′ R and semicircular support W, as described, and for the purposes set forth.

2. The horizontal support N, attached to the frame-work A and braces M H H, and provided with circular opening Z for the bevel-wheels R″ R″, as shown and described, and for the purposes set forth.

3. The combination, in a street-sweeping machine, of the bevel-wheel L, provided with a set-screw, h, the point of which enters a groove, y, in the shaft C, and the clutch K, the latter operated from the seat of the driver by means of the handle J″ and shaft J′, as described, and for the purposes set forth.

4. The combination, in a street-sweeping machine, of chains O O, pulleys P P P P, broom-shaft B, semicircular support W, bevel-wheels R R′, universal joint and shaft U, bevel-wheels R″ R″, and bevel-wheels L′ L, as shown and described, and for the purposes set forth.

5. The combination, in a street-sweeping machine, of chains O O, pulleys P P P P, broom-shaft B, brooms f, semicircular support W, bevel-wheels R R′, universal joint and shaft U, bevel-wheels L′ L, as shown and described, and for the purposes set forth.

EUGENE G. ROCK.

Witnesses:
H. A. TOULMIN,
WILLIAM TINDALL.